Oct. 9, 1951 M. WATTER 2,571,080
COMBINATION LEG REST AND RECLINING SEAT FOR VEHICLES
Filed Nov. 27, 1945 4 Sheets-Sheet 1
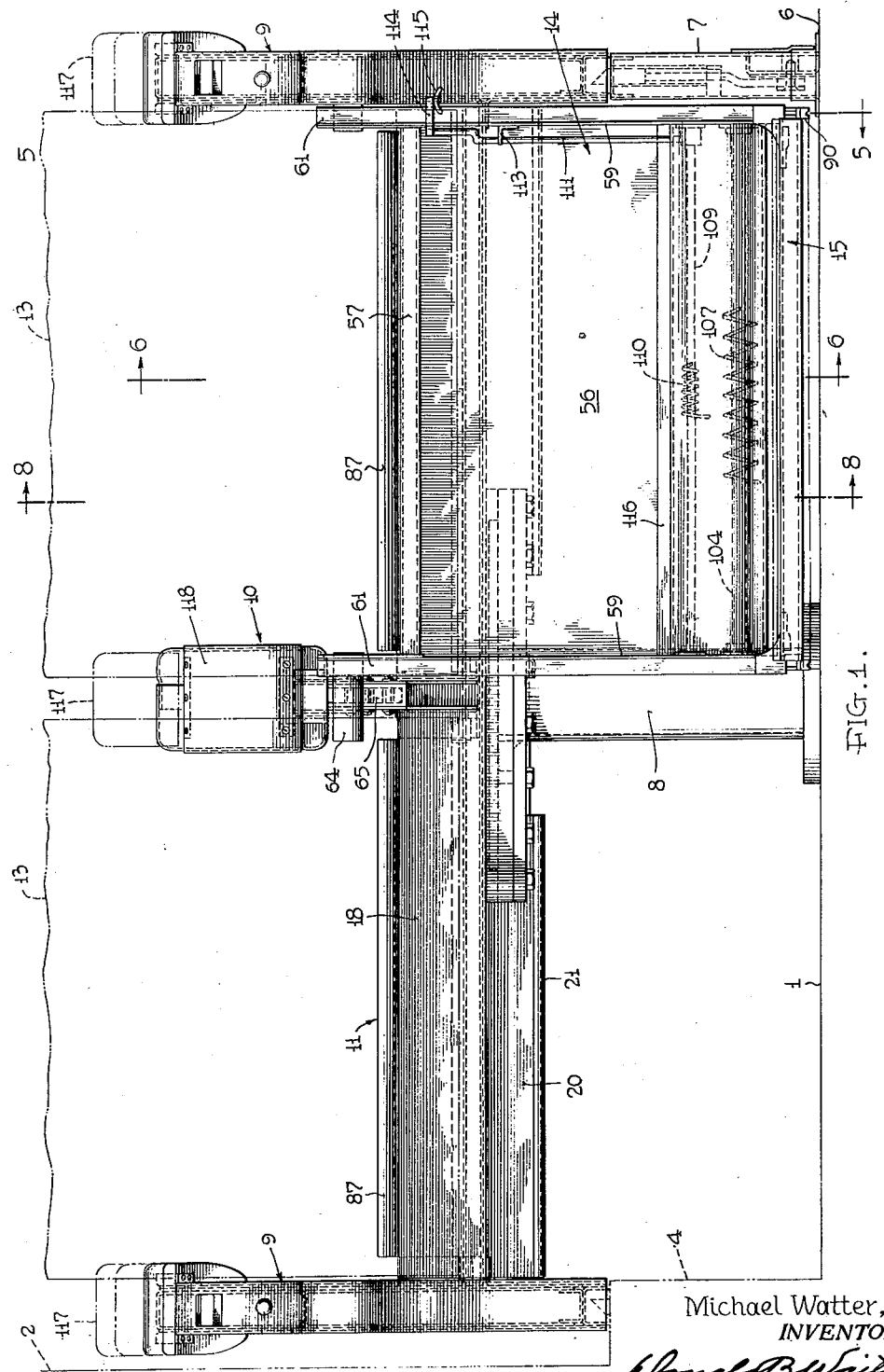
Michael Watter,
INVENTOR
ATTORNEY Oct. 9, 1951  M. WATTER  2,571,080
COMBINATION LEG REST AND RECLINING SEAT FOR VEHICLES
Filed Nov. 27, 1945  4 Sheets-Sheet 2
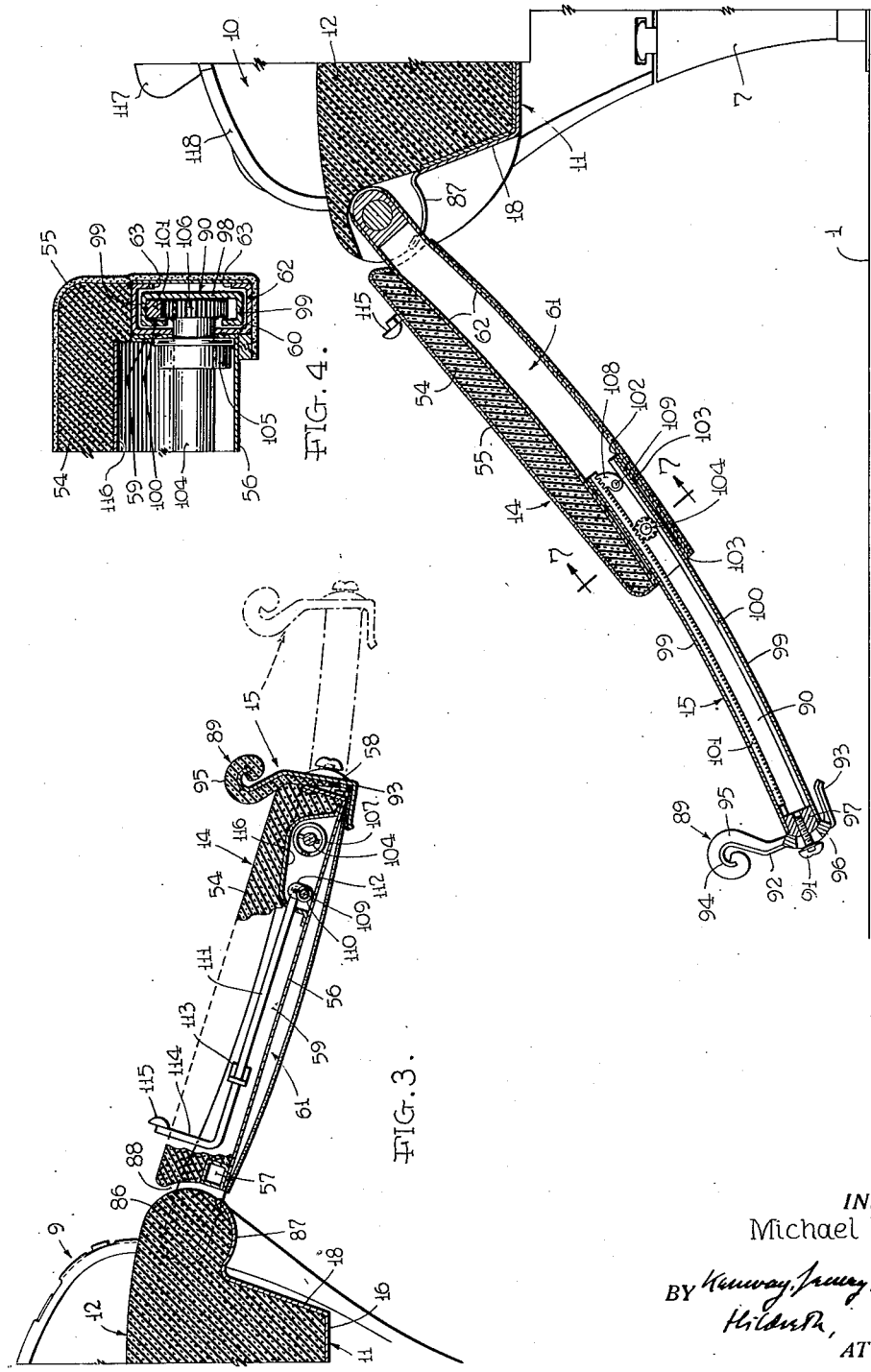
*INVENTOR*
Michael Watter,
*ATTORNEY*

Oct. 9, 1951   M. WATTER   2,571,080
COMBINATION LEG REST AND RECLINING SEAT FOR VEHICLES
Filed Nov. 27, 1945   4 Sheets-Sheet 3

INVENTOR
Michael Watter,
BY
*Honald B Waite*
ATTORNEY

Oct. 9, 1951 M. WATTER 2,571,080
COMBINATION LEG REST AND RECLINING SEAT FOR VEHICLES
Filed Nov. 27, 1945 4 Sheets-Sheet 4

*INVENTOR*
Michael Watter,

BY
*ATTORNEY*

Patented Oct. 9, 1951

2,571,080

UNITED STATES PATENT OFFICE 2,571,080

COMBINATION LEG REST AND RECLINING SEAT FOR VEHICLES

Michael Watter, Philadelphia, Pa., assignor, by mesne assignments, to Heywood-Wakefield Company, Gardner, Mass., a corporation of Massachusetts Application November 27, 1945, Serial No. 631,131

3 Claims. (Cl. 155—171)

The invention relates to reclining seats having leg rest attachments, and more particularly to said seats adapted for railway coaches and other vehicles, such as for instance, buses or airplanes.

Among the objects of the invention is to provide a seat of the indicated type which will allow the occupants to sit comfortably either in upright position with their feet hanging down or on the floor, or with their legs supported in forwardly and downwardly inclined position, or in a semi-lying position with their legs raised, while at the same time the space required for the new seat is equal only to or is not substantially greater than the normal spacing between successive seats now used in railway coaches, that is, in the neighborhood of about 41 inches from center to center.

Another object of the invention is to provide a seat fulfilling the aforesaid aims and being at the same time of simple and rugged construction so as to withstand the use and sometimes the abuse to which it will be subjected during the many years of service a railway car and its equipment are expected to give.

The aforesaid and other objects and advantages are achieved according to the invention by a seat having attached to its front portion a leg rest which latter is provided with an extensible foot rest, both the leg rest and the foot rest being adjustable respectively in regard to their angular position and to the length of the extension.

Other features of the invention have to do with the attachment of the leg rest to the seat and with various details of the foot rest and other parts of the new seat. Such further features as well as further objects and advantages of the invention will become apparent from the embodiments illustrated in the attached drawing and described in the following.

In the drawing,

Figure 1 is a fragmentary front elevation of two combined seats of my invention with the leg and foot rests of one of the seats and the entire upholstering omitted so as to show more clearly the different details of the construction;

Figure 2 is a fragmentary section through the leg rest and the foot rest showing the guiding and part of the operating mechanisms for the latter together with an adjoining portion of the seat proper, being taken substantially along line 5—5 of Fig. 1;

Figure 3 is a section similar to Fig. 2 but showing the leg rest in raised position and other parts of the operating mechanism for the foot rest, the section being taken substantially along line 6—6 of Fig. 1;

Figure 4 is a fragmentary section along line 7—7 of Fig. 2;

Figure 5:
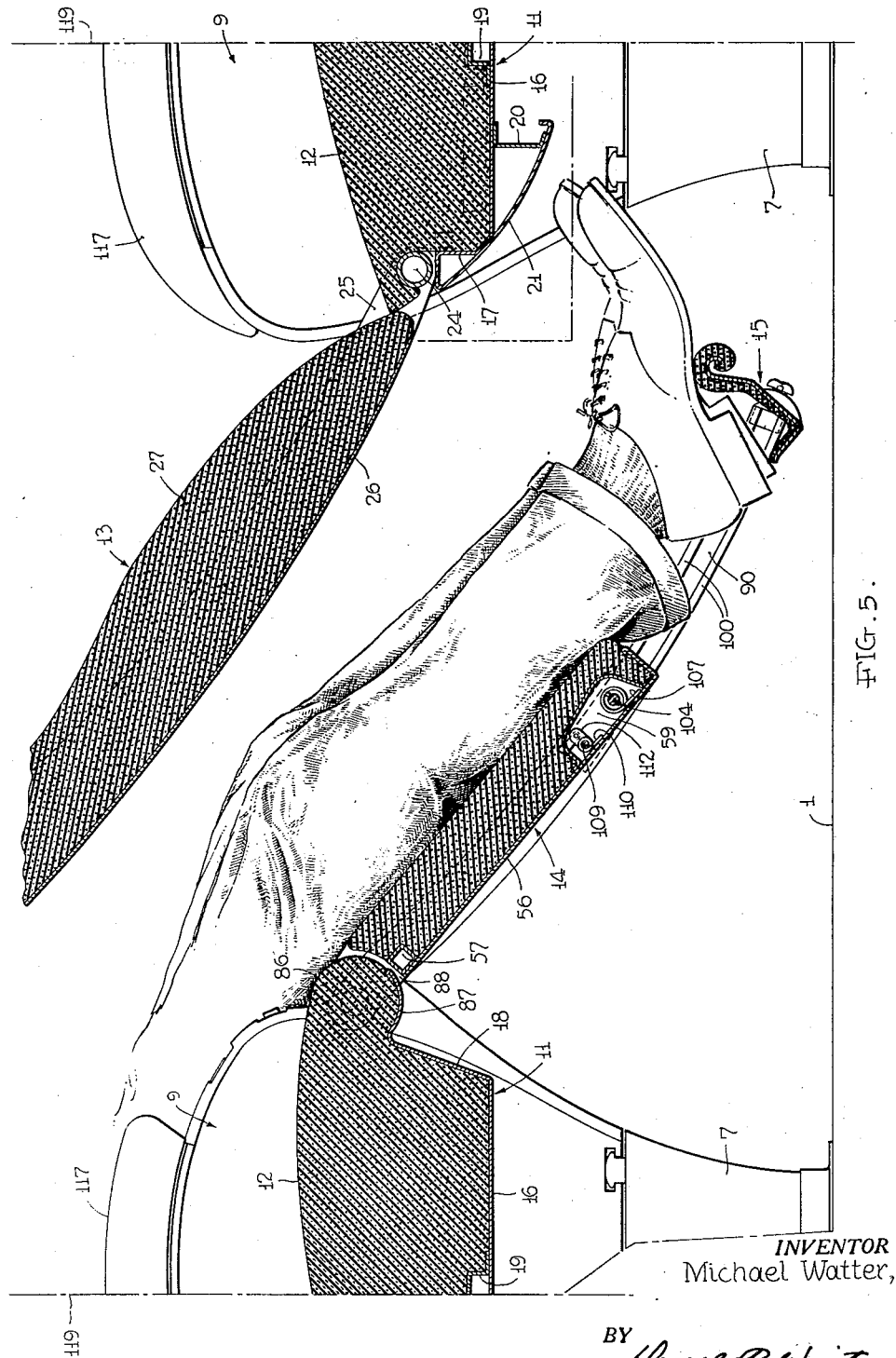
Figure 6:
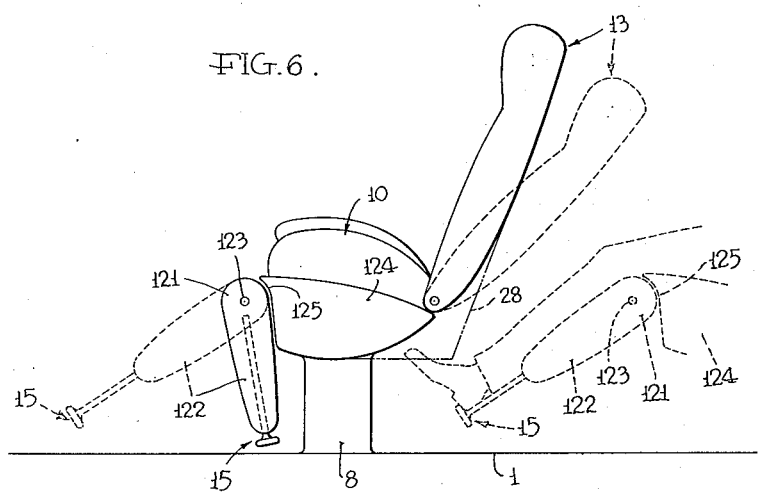
Figure 7:
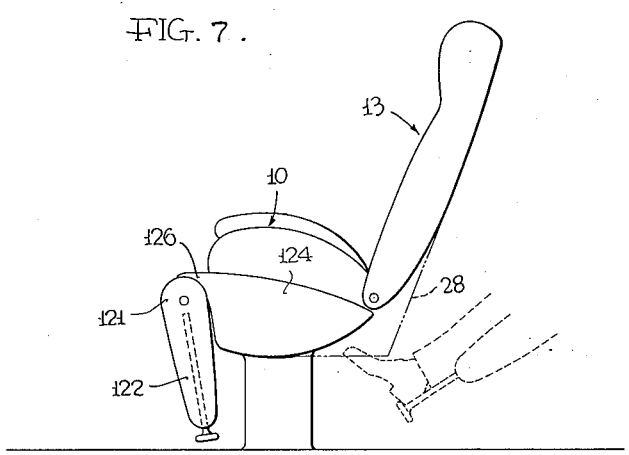

Figure 5 is a fragmentary longitudinal section substantially in the plane indicated by line 8—8 of Fig. 1 through two successive seats, one seat showing the legs and feet of a person supported respectively in the raised leg rest and the extended foot rest while the back rest of the other seat is shown in lowered position; and Figures 6 and 7 are diagrammatic fragmentary sections through the juncture of the seat cushion and the leg rest illustrating two further modifications.

Figure 1 of the drawings shows fragmentary parts of the floor 1 and one side wall 2 of a railway car. Mounted partly on the floor and partly on the projecting portion or heater duct 4 along the side wall are pairs of seats as shown. Two rows of such seats may be arranged along the opposite side walls, leaving an aisle between them.

Each pair of seats comprises the following main elements: Two stationary floor supports 7 and 8 in addition to the support afforded by heater duct 4, end supporting arm rest structures 9, a separating arm rest structure 10, a supporting structure 11 for the seat cushions 12, a pair of back rests 13, and a pair of leg rests 14 each with a foot rest 15.

The structure 11 which is in the general form of a trough with a bottom wall 16, a back wall 17 and a front wall 18 extends between and is structurally connected to the end walls 9 and supports and is likewise structurally connected to the intermediate arm rest 10. 19 and 20 are reinforcements welded to the bottom wall 16 of the seat support 11. A panel 21 curved in cross section, which may form one piece with the rear wall 17, is secured, as by welding, to the bottom wall 16 and to the lower margin of the reinforcing rail 20. This panel 21 constitutes together with the members 17 and 20 and the bottom wall 16 two closed box sectional structures which constitute to the strength of the seat support 11, see right part of Figure 5. The members 19, 20 and 21 are likewise secured to the end structures 9 and also to the intermediate arm rest 10.

Rotatably supported in bearings (not shown) in the end structure 9 is a tubular shaft 24 for each back rest. Each of these shafts 24 has integrally secured thereto adjacent the respective arm rests 9 and 10 a bracket 25 which in turn is secured to the support 26 for the back rest cushion 27. This arrangement is best shown in Figure 5.

The leg rest 14 comprises a cushion 54 covered with a fabric covering 55 and a supporting structure for the cushion. This supporting structure has a main bottom panel 56 secured at its upper margin to a tubular transverse member 57 and reinforced along its bottom margin by an upstanding flange 58. Along each side the panel 56 is likewise provided with an upstanding flange 59 which is secured, such as by welding, to the upstanding bottom wall or web 60 of a channel section member or rail 61 having outwardly directed side walls 62 and flanges 63 directed toward each other.

The members 61 extend beyond the inner or upper margin of the panel 56 and beyond the member 57 to the ends of which they are secured. The members 61 adjacent the middle arm rest 10 are rotatably supported on the ends of the short shaft 64 forming part of a bracket 65 secured to the structure 10. The position of leg rest 14 may be controlled by suitable mechanism (not shown) in the end structure 9.

The front edge of the seat cushion 12 has a cylindrical portion 86 arranged concentrically to the axis of the leg rest supports 64 and 66 and on its underside it is supported by an extension 87 of the front wall 18 of the cushion supporting structure 11. This extension 87 is likewise curved in cross section concentrically to the axis of the leg rest attachment. The underside of the cylindrical portion 86 is recessed adjacent and the supporting portion 87 ends short of the structures 9 and 10 so as to make room for the upper ends of the rails 61 of the leg rest. The leg rest cushion 54 has its upper margin concavely shaped concentrically to the leg rest supporting axis, leaving merely a narrow space 88 between it and the aforesaid cylindrical portions 86, 87. This arrangement provides for a front edge of the seat cushion of sufficient softness while on the other hand a narrow space only is left between the front edge of the seat cushion and the leg rest which is essentially for the comfort of the occupant.

The foot rest 15 comprises as its main elements a transverse member 89 and two lateral rails 90 which have their outer ends secured to the rail 89 by screw bolts 91. The cross member 89 may have a main web portion 92 and lower arm or flange 93 directed toward the side and an upwardly cylindrically rolled-in portion 94. This structure 92 to 94 is covered by a member 95 of soft rubber or a similar material giving a good hold for the feet of the occupant. The connection between the members 89 and 90 comprises shoes or brackets 96, 97, respectively, connected to one of the two members and provided with corresponding cylindrical surfaces. The bolt 91 is screw threaded into the member 97 and passes through an elongated slot of the member 96. This arrangement permits the angular adjustment of the member 89 with respect to the rails 90 about a transverse axis.

The rails 90 each consist of an inwardly facing channel with a bottom wall 98, side walls 99 and flanges 100 directed toward each other. Secured to the upper one of the side walls 99 is a tooth rack 101 which may extend over the entire length of the respective member 90. The member 90 is slidably guided in the side channel members or rails 61 of the leg rest by means of wear plates 102, 103, respectively secured to the outside of the rail 90 and the inside of the rail 61. These plates serve simultaneously for limiting the outward movement of the rails 90. The rails 90 and 91 are curved in side view, as clearly shown in several of the figures. This is for the purpose of elevating the foot rest member 89 above the surface of the leg rest cushion 43 when the foot rest is in its outwardly projected position, whereas when the foot rest is retracted, it projects a small distance only above the leg rest, as shown in Figure 3.

The operating mechanism for the foot rest is supported entirely by the leg rest with the exception of the aforementioned rack 101. A transverse shaft 104 supported in bearings 105 secured to the side walls 55 of the panel 56 of the leg rest, carries on each of its ends a pinion 106 which in turn meshes with the respective tooth rack 101. A torsion spring 107 surrounding the shaft 104 has one of its ends in engagement with said shaft and the other end in engagement with the supporting structure of the leg rest, such as with the member 56. This spring is so arranged and adjusted that it will retract the foot rest by means of the shaft 104, the pinions 106 and the racks 101 to the innermost position unless prevented from doing so. The arrangement of the aforedescribed parts is best shown in Figures 2 to 5.

For holding the foot rest in any desired position of outward extension, each of the racks 101 is also engaged by a pawl 108. These pawls are supported by and firmly connected with the ends of a transverse shaft 109 which is likewise rotatably supported in the structure 56 and are held in the engaging position by a torsion spring 110. An operating rod 111 is journalled to a projecting arm 112 of the shaft 109 and slidably engaged in a bracket 113 of the structure 56. The other end of the rod 111 is provided with a cross piece 114 ending in an operating handle 115 and extending outwardly through a space (not shown) left between the top of the respective side rail 61 and the marginal portion of the leg rest cushion 54.

The shafts 104, 109, the torsion springs 107, 110, the bearings 105, the lever 112 and the adjoining end of the rod 111 are covered by a transverse channel section member 116 which is secured mouth-down to the panel 56. This member 116 not only supports the leg rest cushion 54 spaced from the aforesaid parts of the operating mechanism for the foot rest but also constitutes at the same time a reinforcement for the supporting structure of the leg rest.

For adjustment of the foot rest, the occupant has to pull the handle or finger grip 115 thereby disengaging the pawls 108, whereupon he may either push the foot rest outwardly by pressing his feet against the cross member 89 or he may allow the foot rest to move inwardly under the action of the spring 107 by withdrawing his feet. Upon release of the handle 115, the rack 101 will be reengaged by the pawls 108 and thereby the foot rest stopped in the new position.

Minor details of the structure, most of which are customary in seats of this type, have not been described in detail but will, of course, be supplied, such as for instance, the upholstered, removable, top members 117 secured to the arm rest structures 9 and 10 and the fabric covering for the different cushions, which latter may consist of sponge rubber moldings, and the widened portion 118 of the front of the middle arm rest housing the tuning devices (not shown) for individual broadcast reception devices.

In the modification diagrammatically shown in Fig. 6, the upper edge portion 121 of the leg rest cushion 122 is cylindrically shaped concentrically to the axis 123 of the leg rest attachment and the seat cushion 124 has a corresponding cylindrical recess 125 along its front edge. Portion 121 is of a material such as soft rubber so as to constitute a sufficiently soft front edge for the seat when the leg rest is in its lowered position. Other main parts of the structure are identified by the same numeral used for the corresponding parts of the first embodiment.

In the further modification shown in Figure 7, the arrangement is substantially identical with the arrangement shown in Figure 6 with the exception that the seat cushion 124 has a projecting portion 126 which overlies the top of the cylindrical portion 121 of the leg rest, thereby closing the gap between leg rest and seat cushion and affording an uninterrupted seat surface.

While one embodiment of the invention is shown and described in detail and two further modifications are shown diagrammatically, obviously many other modifications are conceivable without departing from the invention as covered by the attached claims.

What is claimed is:

1. Seat especially for railway cars comprising a seat cushion and a leg rest attached swingably about a horizontal axis to the support for the seat cushion, one of said leg rest and said seat cushion being provided with an upholstered edge of part-circular cross section arranged concentrically to said axis, and providing padding at least as deep as from said edge to below said axis, and the other one of said seat cushion and leg rest being provided with a corresponding recess of part-circular section formed by upholstered padding so that the seat cushion and the foot rest present in any position of the foot rest a substantially continuous supporting surface and so that seating surface has an upholstered and resilient front edge irrespective of the leg rest and its position.

2. Seat especially for railway cars and other vehicles comprising a seat cushion and a support therefor and a leg rest attached to said support swingably about a horizontal axis running parallel to the front margin of the seat cushion, said leg rest having a softly upholstered margin of part-circular cross section arranged substantially concentrically to said axis and providing padding at least as deep as from said edge to below said axis, and said seat cushion being provided with a corresponding part-circular recess into which fits the part-circular portion of the leg rest.

3. Seat according to claim 2, said seat cushion having along its upper front margin a flexible relatively thin extension which overlies and rests on the adjoining portion of the leg rest and covers the space between seat cushion and leg rest.

MICHAEL WATTER.

REFERENCES CITED

The following references are of record in the file of this patent:

UNITED STATES PATENTS

| Number | Name | Date |
|---|---|---|
| 21,562 | Holmes | Sept. 21, 1858 |
| 25,448 | Smith | Sept. 13, 1859 |
| 134,733 | Collins | Jan. 14, 1873 |
| 715,667 | Kenny | Dec. 9, 1902 |
| 831,777 | Dryer | Sept. 25, 1906 |
| 868,324 | Buckman | Oct. 15, 1907 |
| 972,073 | Flindall | Oct. 4, 1910 |
| 1,715,118 | Clark | May 28, 1929 |
| 2,145,660 | Marshall et al. | Jan. 31, 1939 |
| 2,174,626 | Dale | Oct. 3, 1939 |
| 2,266,055 | Luckhardt | Dec. 16, 1941 |

FOREIGN PATENTS

| Number | Country | Date |
|---|---|---|
| 135,845 | Germany | Nov. 15, 1902 |
| 10,845 | Great Britain | May 25, 1901 |